United States Patent
Ishikawa

(10) Patent No.: US 10,442,045 B2
(45) Date of Patent: Oct. 15, 2019

(54) TELESCOPIC COVER AND METHOD FOR ADJUSTING THE POSITION OF A TELESCOPIC COVER

(71) Applicant: FANUC CORPORATION, Yamanashi (JP)

(72) Inventor: Ryuutarou Ishikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/696,319

(22) Filed: Sep. 6, 2017

(65) Prior Publication Data
US 2018/0065225 A1 Mar. 8, 2018

(30) Foreign Application Priority Data
Sep. 7, 2016 (JP) ................ 2016-174549

(51) Int. Cl.
*E06B 3/92* (2006.01)
*B23Q 11/08* (2006.01)

(52) U.S. Cl.
CPC ......... *B23Q 11/0825* (2013.01); *E06B 3/921* (2013.01)

(58) Field of Classification Search
CPC ..... E06B 3/921; B23Q 11/0825; B23Q 11/08; B23Q 11/0816
See application file for complete search history.

(56) References Cited

U.S. PATENT DOCUMENTS

| 3,565,153 | A | * | 2/1971 | Loos | B23Q 11/0825 160/202 |
| 3,824,890 | A | * | 7/1974 | Zettler | B23Q 11/0816 144/251.1 |
| 4,886,375 | A | * | 12/1989 | Tsukada | B23Q 11/0825 384/15 |
| 4,950,113 | A | | 8/1990 | Winkler et al. | |
| 5,088,839 | A | * | 2/1992 | Tsukada | F16C 29/10 384/15 |
| 5,156,195 | A | * | 10/1992 | Wehler | B23Q 11/0825 160/202 |
| 5,169,223 | A | * | 12/1992 | Suzuki | B23Q 11/0825 160/202 |

(Continued)

FOREIGN PATENT DOCUMENTS

| CN | 202878017 U | 4/2013 |
| CN | 104259868 A | 1/2015 |

(Continued)

*Primary Examiner* — Katherine W Mitchell
*Assistant Examiner* — Abe Massad
(74) *Attorney, Agent, or Firm* — Hauptman Ham, LLP

(57) ABSTRACT

An uppermost cover member of a telescopic cover is fixed to a movable member (a saddle or a table), whereas a lowermost cover member of the telescopic cover is fixed to a stationary member (a pedestal or the saddle) of a machine tool, the stationary member being stopped with respect to a direction of movement of at least the movable member. Attached members, which project outwardly along the direction of movement from the telescopic cover, and which are attached by fastening members to the stationary member, are provided on the cover member. The telescopic cover is provided with a skirt, which is capable of sliding along the direction of movement with respect to the cover member, and which covers the attached members.

14 Claims, 11 Drawing Sheets

(56) References Cited

U.S. PATENT DOCUMENTS

| | | | | |
|---|---|---|---|---|
| 5,915,897 A | * | 6/1999 | Reynolds | B23Q 11/0825 160/202 |
| 6,296,413 B1 | * | 10/2001 | McCann | B23Q 11/0816 384/15 |
| 7,412,759 B1 | * | 8/2008 | Hsieh | B23Q 11/0825 160/202 |
| 7,458,754 B2 | * | 12/2008 | Hsieh | B23Q 11/0825 160/202 |
| 7,784,379 B2 | * | 8/2010 | Schirling | B23Q 11/0816 160/202 |
| 8,006,727 B1 | * | 8/2011 | Urban | B23D 59/00 144/251.1 |
| 2016/0271835 A1 | * | 9/2016 | Kato | B28D 5/024 |

FOREIGN PATENT DOCUMENTS

| | | |
|---|---|---|
| CN | 205057662 U | 3/2016 |
| CN | 205271590 U | 6/2016 |
| DE | 19739429 A1 | 3/1999 |
| JP | S62-72043 U | 5/1987 |
| JP | H8-192333 A | 7/1996 |
| JP | 11-277363 A | 10/1999 |
| JP | 2002-233926 A | 8/2002 |
| JP | 2006-142435 A | 6/2006 |
| JP | 2009-241163 A | 10/2009 |
| JP | 2014-184506 A | 10/2014 |
| JP | 2015-6701 A | 1/2015 |

* cited by examiner

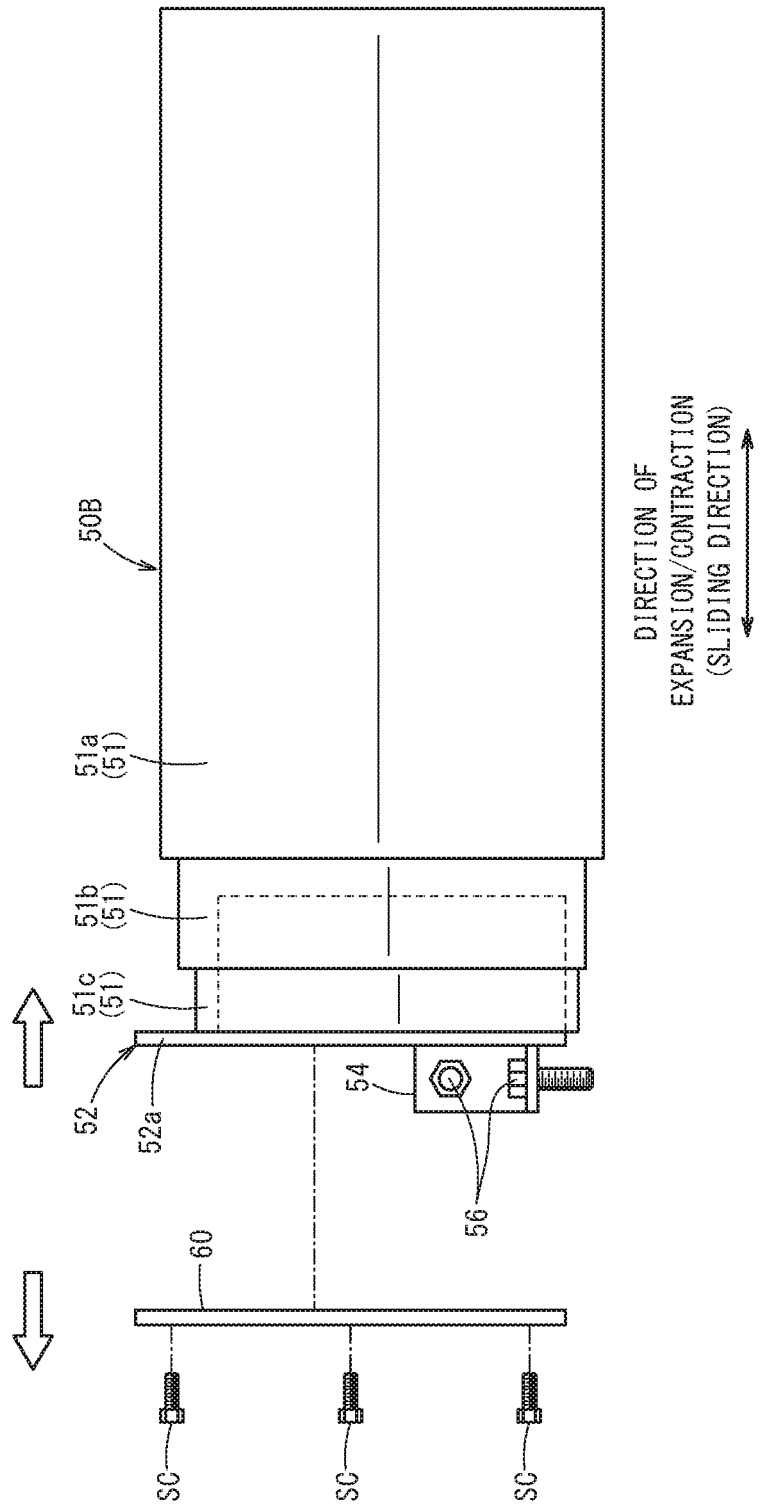

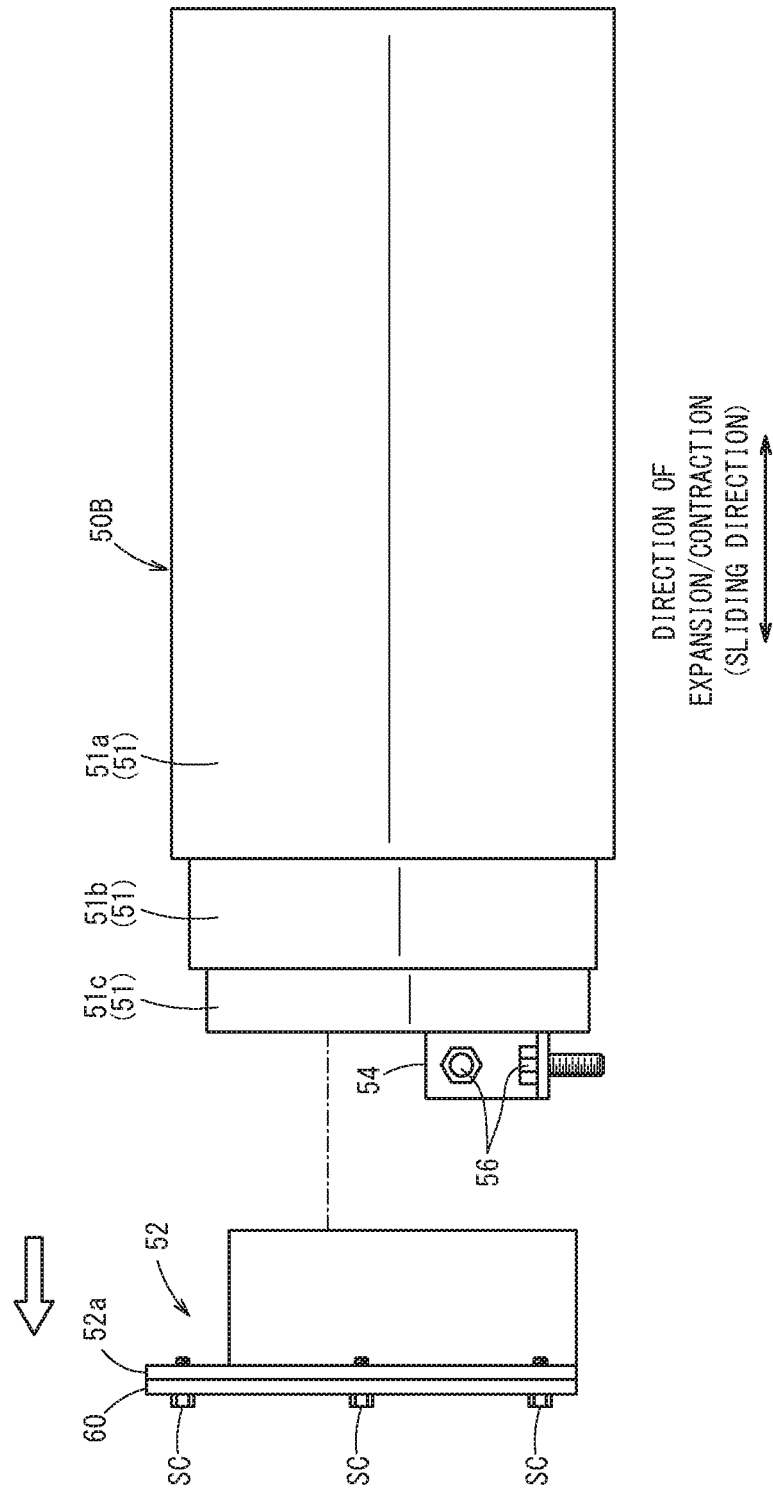

TELESCOPIC COVER AND METHOD FOR ADJUSTING THE POSITION OF A TELESCOPIC COVER

CROSS-REFERENCE TO RELATED APPLICATION

This application is based upon and claims the benefit of priority from Japanese Patent Application No. 2016-174549 filed on Sep. 7, 2016, the contents of which are incorporated herein by reference.

BACKGROUND OF THE INVENTION

Field of the Invention:

The present invention relates to a telescopic cover which is capable of being adjusted in position, as well as a method for adjusting the position of a telescopic cover.

Description of the Related Art:

Japanese Laid-Open Patent Publication No. 11-277363 discloses a telescopic cover which is provided on a machine tool. Japanese Laid-Open Patent Publication No. 11-277363 discloses an invention, which was devised to prevent operative malfunctions of the telescopic cover, which occur due to chips becoming accumulated in a gap existing between a distal end of the telescopic cover, and the back surface of a splash cover adapted to cover the periphery of an XY table.

More specifically, a wiper is provided, which moves in conjunction with opening and closing of a door provided on the splash cover, and a gap cover, which covers a gap formed between a distal end of the telescopic cover and the back surface of the splash cover, is provided on the machine tool. The wiper sweeps away chips that have accumulated on the upper surface of a unit cover at a distal end portion of the telescopic cover.

SUMMARY OF THE INVENTION

In this instance, the telescopic cover, which serves to protect a moving mechanism of the machine tool from cutting fluid and chips, is fixed to the machine tool by fastening members such as bolts or the like. Since the chips become caught on the fastening members, it is desirable for the fastening members not to be exposed. On the other hand, at a time that the position of the telescopic cover is adjusted, since it is necessary to loosen or detach the fastening members, it also is desirable for the fastening members to be exposed.

However, in Japanese Laid-Open Patent Publication No. 11-277363, although the gap that exists between the distal end of the telescopic cover and the back surface of the splash cover can be concealed by the gap cover, there is no disclosure whatsoever concerning the fastening members. Consequently, with Japanese Laid-Open Patent Publication No. 11-277363, the two demands noted above cannot be satisfied.

Thus, an object of the present invention is to provide a telescopic cover and a method of adjusting the position of a telescopic cover, which are capable of preventing chips from becoming caught on fastening members, and which enable an adjustment in position of the telescopic cover to be easily performed.

A first aspect of the present invention is characterized by a telescopic cover, in which a plurality of cover members are superimposed in a nested fashion, and which expands and contracts in accordance with movement of a movable member of a machine tool, wherein an uppermost cover member of the telescopic cover is fixed to the movable member, and a lowermost cover member of the telescopic cover is fixed to a stationary member of the machine tool, which is stopped with respect to a direction of movement of at least the movable member, an attached member, which projects outwardly along the direction of movement from the telescopic cover and is attached by fastening members to the stationary member, is provided on the lowermost cover member, and further comprising a skirt, which is capable of sliding along the direction of movement with respect to the lowermost cover member, and which covers the attached members and the fastening members.

In accordance with this configuration, at a time of machining by the machine tool, the attached member and the fastening members can be protected from the chips. Consequently, it is possible to prevent the chips from becoming caught on the attached member and the fastening members. On the other hand, when adjusting the position of the telescopic cover, by sliding the skirt, it is possible for the fastening members to be exposed. Accordingly, positional adjustment of the telescopic cover can be performed easily.

In the first aspect of the present invention, the skirt may be disposed underneath the lowermost cover member, so as to overlap in a nested fashion with the lowermost cover member.

In accordance with this feature, it is possible to provide the skirt on the telescopic cover, without hindering the expansion and contraction of the telescopic cover in which the plurality of cover members are superimposed in a nested fashion.

In the first aspect of the present invention, at a time of machining by the machine tool, an end portion of the skirt on a side in a direction in which the attached member protrudes may abut against a splash guard which is adapted to cover a machining area of the machine tool, and prevent scattering of chips that are generated by machining.

In accordance with this feature, at a time of machining, it is possible to prevent the chips from entering into the interior of the telescopic cover, and to protect the attached member and the fastening members from the chips. Consequently, it is possible to prevent the chips from becoming caught on the attached member and the fastening members. On the other hand, when adjusting the position of the telescopic cover, by sliding the skirt in a direction opposite to the direction in which the attached member protrudes, it is possible for the fastening members to be exposed. Accordingly, positional adjustment of the telescopic cover can be performed easily.

In the first aspect of the present invention, a skirt cover may be attached to the skirt, the skirt cover covering an end portion of the skirt on a side in a direction in which the attached member protrudes, and preventing chips that are generated due to machining by the machine tool from penetrating into the interior of the telescopic cover.

In accordance with this feature, even if the skirt is not in abutment against the splash guard, at a time of machining, it is possible to prevent the chips from entering into the interior of the telescopic cover. As a result, the attached member and the fastening members can be protected from the chips. Consequently, it is possible to prevent the chips from becoming caught on the attached member and the fastening members. Further, on the other hand, at a time of adjusting the position of the telescopic cover, after having removed the skirt cover from the skirt, by sliding the skirt in a direction opposite to the direction in which the attached member protrudes, or by sliding the skirt on which the skirt cover is mounted in the direction in which the attached member protrudes, it is possible to expose the fastening members. Accordingly, positional adjustment of the telescopic cover can be performed easily.

In the first aspect of the present invention, the skirt cover may be mounted detachably with respect to the skirt.

A second aspect of the present invention is characterized by a method of adjusting the position of a telescopic cover in which a plurality of cover members are superimposed in a nested fashion, and which expands and contracts along a direction of movement of a movable member of a machine tool, comprising the steps of fixing an uppermost cover member of the telescopic cover to the movable member, and fixing a lowermost cover member of the telescopic cover to a stationary member of a machine tool, which is stopped with respect to a direction of movement of at least the movable member, providing an attached member on the lowermost cover member, wherein the attached member projects outwardly along the direction of movement from the telescopic cover, and is attached by fastening members to the stationary member, providing a skirt, which is capable of sliding along the direction of movement with respect to the lowermost cover member, and which covers the attached members and the fastening members, and sliding the skirt to thereby expose the fastening members.

In accordance with this configuration, at a time of machining by the machine tool, the attached member and the fastening members can be protected from the chips. Consequently, it is possible to prevent the chips from becoming caught on the attached member and the fastening members. On the other hand, when adjusting the position of the telescopic cover, by sliding the skirt, it is possible for the fastening members to be exposed. Accordingly, positional adjustment of the telescopic cover can be performed easily.

In the second aspect of the present invention, there may further be provided the steps of placing an end portion of the skirt on a side in a direction in which the attached member protrudes in abutment against a splash guard which is adapted to cover a machining area of the machine tool and prevent scattering of chips that are generated by machining, and sliding the skirt in a direction opposite to the direction in which the attached member protrudes to thereby expose the fastening members.

In accordance with this feature, at a time of machining, it is possible to prevent the chips from entering into the interior of the telescopic cover, and to protect the attached member and the fastening members from the chips. Consequently, it is possible to prevent the chips from becoming caught on the attached member and the fastening members. On the other hand, when adjusting the position of the telescopic cover, by sliding the skirt in a direction opposite to the direction in which the attached member protrudes, it is possible for the fastening members to be exposed. Accordingly, positional adjustment of the telescopic cover can be performed easily.

In the second aspect of the present invention, there may further be provided the steps of detachably mounting a skirt cover on the skirt, the skirt cover covering an end portion of the skirt on a side in a direction in which the attached member protrudes, and preventing chips that are generated due to machining by the machine tool from penetrating into the interior of the telescopic cover, and after having removed the skirt cover from the skirt, sliding the skirt in the direction opposite to the direction in which the attached member protrudes to thereby expose the fastening members.

In accordance with this feature, even if the skirt is not in abutment against the splash guard, at a time of machining, it is possible to prevent the chips from entering into the interior of the telescopic cover. As a result, the attached member and the fastening members can be protected from the chips. Consequently, it is possible to prevent the chips from becoming caught on the attached member and the fastening members. Further, on the other hand, when adjusting the position of the telescopic cover, after having removed the skirt cover from the skirt, by sliding the skirt in the direction opposite to the direction in which the attached member protrudes, it is possible for the fastening members to be exposed. Accordingly, positional adjustment of the telescopic cover can be performed easily.

In the second aspect of the present invention, there may further be provided the steps of mounting a skirt cover on the skirt, the skirt cover covering an end portion of the skirt on a side in a direction in which the attached member protrudes, and preventing chips that are generated due to machining by the machine tool from penetrating into the interior of the telescopic cover, and sliding the skirt on which the skirt cover is mounted in the direction in which the attached member protrudes, and removing the skirt from the telescopic cover to thereby expose the fastening members.

In accordance with this feature, even if the skirt is not in abutment against the splash guard, at a time of machining, it is possible to prevent the chips from entering into the interior of the telescopic cover. As a result, the attached member and the fastening members can be protected from the chips. Consequently, it is possible to prevent the chips from becoming caught on the attached member and the fastening members. Further, on the other hand, when adjusting the position of the telescopic cover, by sliding the skirt in a direction in which the attached member protrudes, and then removing the skirt from the telescopic cover, it is possible for the fastening members to be exposed. Accordingly, positional adjustment of the telescopic cover can be performed easily.

According to the present invention, at a time of machining by the machine tool, the attached member and the fastening members can be protected from the chips. Consequently, it is possible to prevent the chips from becoming caught on the attached member and the fastening members. On the other hand, when adjusting the position of the telescopic cover, by sliding the skirt, it is possible for the fastening members to be exposed. Accordingly, positional adjustment of the telescopic cover can be performed easily.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 10 is a side view showing a state of the skirt and the skirt cover at a time of adjusting the position of the telescopic cover located on the X-direction side of the table (saddle); and FIG. 11 is a side view showing a modified example of the state of the skirt and the skirt cover at a time of adjusting the position of the telescopic cover located on the X-direction side of the table (saddle).

DESCRIPTION OF THE PREFERRED EMBODIMENTS

A preferred embodiment concerning a telescopic cover and a method of adjusting the position of the telescopic cover according to the present invention will be presented and described in detail below with reference to the accompanying drawings.

Figure 1:
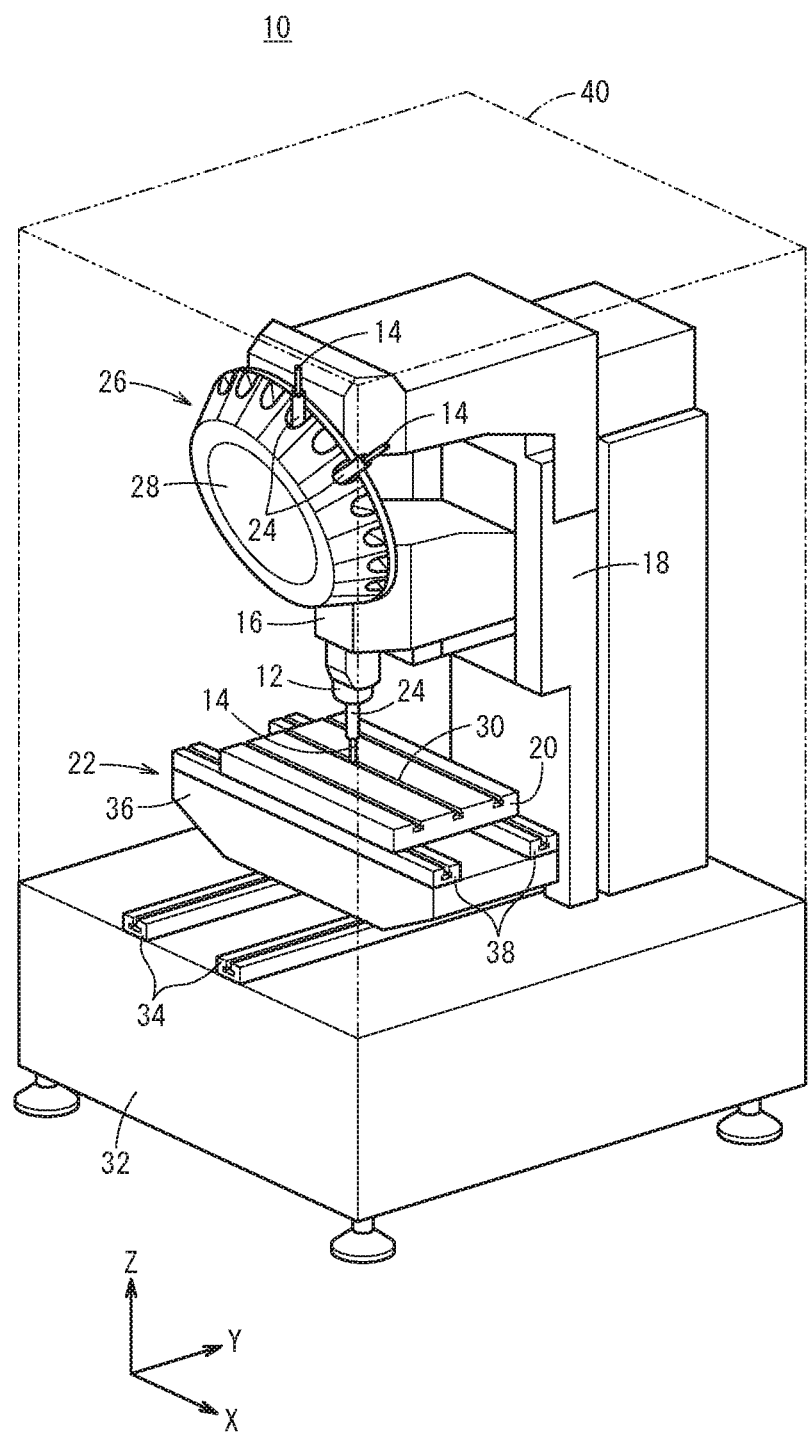
FIG. 1 is an external configuration diagram showing the constitution of a machine tool according to an embodiment of the present invention.

FIG. 1 is an external configuration diagram of a machine tool 10. The machine tool 10 performs machining on a non-illustrated machining target object (workpiece, object to be machined) with a tool (cutting tool) 14 attached to a spindle 12. The machine tool 10 includes the spindle 12, a spindle head 16 that rotatably drives the spindle 12 about an axis of rotation parallel to a Z-direction, a column 18 that moves the spindle head 16 in the Z-direction (vertical direction), a table 20 on which the machining target object is fixed and supported, and a table driving device 22 that causes the table 20 to move in an X-direction and a Y-direction. The X-direction, the Y-direction, and the Z-direction are mutually orthogonal with each other. Due to movement of the spindle 12 in the Z-direction and movement of the table 20 in the X-direction and the Y-direction, the machine tool 10 is capable of machining the machining target object in three dimensions. The negative Z-direction is a direction in which gravity acts.

The tool 14 is supported by a tool holder 24. The tool holder 24 is capable of being attached to and detached from the spindle 12, and the tool 14 is attached to the spindle 12 via the tool holder 24. The tool 14 is attached to the spindle 12 by inserting the tool holder 24 into a mounting hole (not shown) provided on a distal end of the spindle 12. The tool 14 is rotated together with the spindle 12. The machine tool 10 is configured as a machining center, which enables the tool 14 that is attached to the spindle 12 to be exchanged through an automatic tool exchanging device 26. The automatic tool exchanging device 26 includes a tool magazine 28 capable of accommodating (retaining) a plurality of tools 14, each of which is held by a tool holder 24. As examples of such tools 14, there may be cited a heel tool, a drill, an end mill, a milling cutter, etc.

The table 20 is arranged below the spindle 12. On the upper surface of the table 20, lock grooves 30, which extend linearly in the X-direction, are formed at predetermined intervals along the Y-direction. The machining target object is fixed to the table 20 via a non-illustrated workpiece fixing jig. The workpiece fixing jig is constituted so as to be capable of being fixed to the upper surface of the table 20 using the lock grooves 30.

The table driving device 22 is supported on a pedestal 32. The table driving device 22 includes a Y-axis slide section 34, a saddle 36, and an X-axis slide section 38. The saddle 36 is supported movably in the Y-direction with respect to the pedestal 32 via the Y-axis slide section 34. The table 20 is supported movably in the X-direction with respect to the saddle 36 via the X-axis slide section 38.

A non-illustrated Y-axis driving mechanism for moving the saddle 36 in the Y-direction with respect to the pedestal 32 is connected to the saddle 36. In a similar manner, a non-illustrated X-axis driving mechanism for moving the table 20 in the X-direction with respect to the saddle 36 is connected to the table 20. Each of the Y-axis driving mechanism and the X-axis driving mechanism has a servomotor, and a power conversion mechanism (a ball screw and a nut, or the like) for converting rotational motion of the servomotor into rectilinear motion, and transmitting the motion to the saddle 36 and the table 20. Any well-known device is capable of being used for the Y-axis driving mechanism and the X-axis driving mechanism.

The machine tool 10 is provided with a splash guard (splash cover) 40 which is adapted to cover a machining area of the machine tool 10, and to prevent chips (machining debris) and cutting fluid generated due to machining from scattering around the periphery of the machine tool 10. Moreover, the machine tool 10 is provided with nozzles (not shown) for discharging the cutting fluid toward the tool 14 at a time of machining. Although not shown, an opening is formed in the splash guard 40, and the splash guard 40 includes a door for covering the opening, and which is capable of being opened and closed. The opening of the splash guard 40 is provided for the purpose of exchanging the machining target object that is supported on the table 20. At a time of machining, the door of the splash guard 40 is in a closed state, and at a time of exchanging the machining target object, the door is in an open state.

In this instance, in order to protect the above-described Y-axis driving mechanism and the X-axis driving mechanism from chips and cutting fluid that are generated during machining, the machine tool 10 is provided with a telescopic cover that covers and conceals the Y-axis driving mechanism and the X-axis driving mechanism from an upper side (a side in the +Z direction) thereof.

Figure 2:
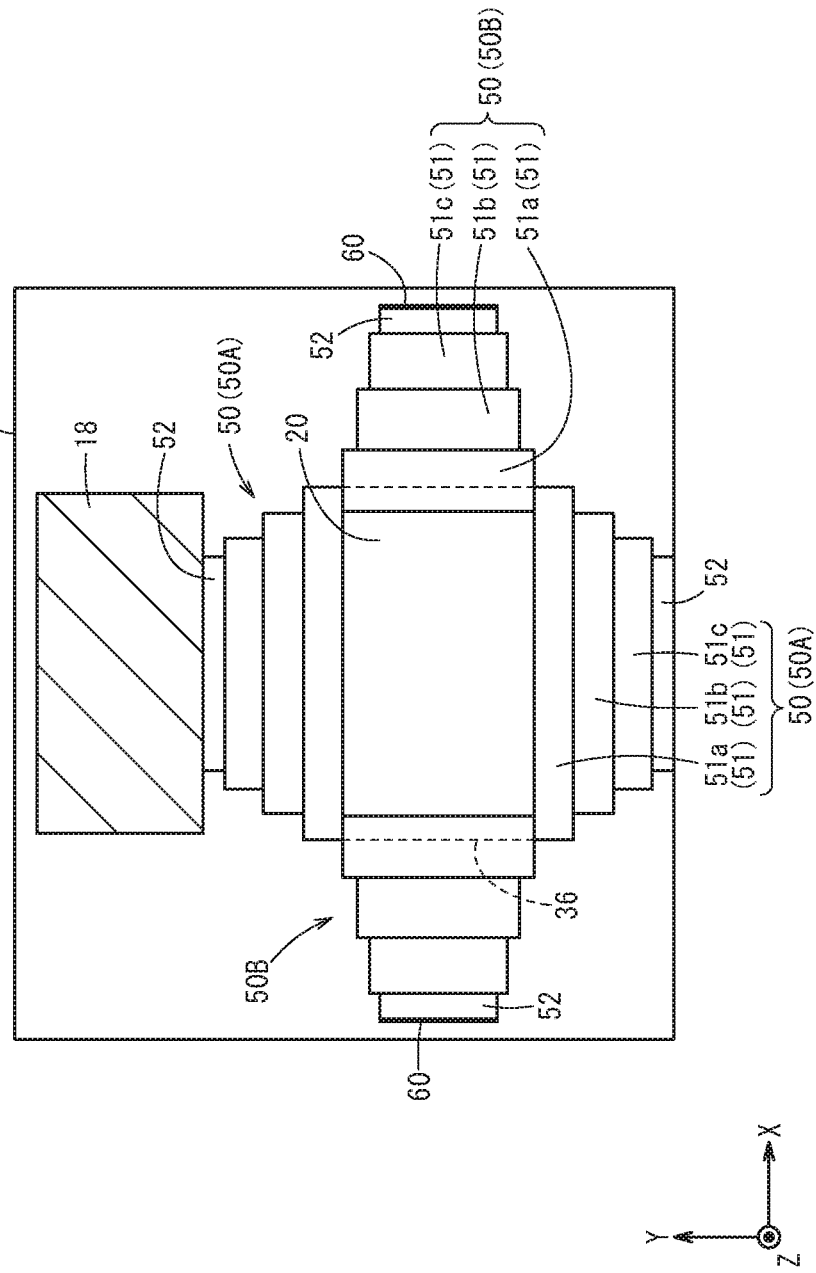
FIG. 2 is a plan view of a telescopic cover provided on the machine tool shown in FIG. 1 as viewed from above.

FIG. 2 is a plan view (upper surface view) of the telescopic cover 50 which is provided on the machine tool 10 as viewed from above (from the +Z direction). The telescopic cover 50 is a cover in which a plurality of cover members 51 are superimposed in a nested fashion, and which is expanded and contracted in accordance with movements of the saddle 36 and the table 20. In cases where it is necessary to distinguish and describe a telescopic cover 50 which is expanded and contracted in accordance with movements of the saddle 36 in the Y-direction, and a telescopic cover 50 which is expanded and contracted in accordance with movements of the table 20 in the X-direction, the former will be referred to by the reference character 50A, and the latter will be referred to by the reference character 50B.

Telescopic covers 50A are provided respectively on the +Y direction side and the −Y direction side of the table 20 (the saddle 36). Further, telescopic covers 50B are provided respectively on the +X direction side and the −X direction side of the table 20 (the saddle 36).

In the present embodiment, in order to facilitate the description thereof, each of the telescopic covers 50 (50A, 50B) will be assumed to include three cover members 51, and the telescopic covers 50 are constituted by superimposing the three cover members 51 in a nested fashion. In order to distinguish the three cover members 51 of the telescopic covers 50 (50A, 50B) from each other, in certain cases, the uppermost cover member 51 will be referred to by the reference character 51a, the middle stage cover member 51 will be referred to by the reference character 51b, and the lowermost cover member 51 will be referred to by the reference character 51c. Further, skirts 52 are provided in the telescopic covers 50. The skirts 52 will be described in detail later.

The uppermost cover members 51a of the telescopic covers 50A are fixed to the saddle 36 which functions as a movable member, whereas the lowermost cover members 51c thereof are fixed to the pedestal 32 which functions as a stationary member that is stopped with respect to the direction of movement (in the Y-direction) of the saddle 36. Consequently, the telescopic covers 50A can protect the Y-axis driving mechanism from chips and cutting fluid, while expanding and contracting in accordance with movements of the saddle 36 in the Y-direction.

More specifically, the uppermost cover member 51a of the telescopic cover 50A provided on the +Y direction side of the saddle 36 is fixed via a non-illustrated stay to the +Y direction side of the saddle 36. On the other hand, the lowermost cover member 51c of the telescopic cover 50A provided on the +Y direction side of the saddle 36 is fixed via a non-illustrated stay to the pedestal 32, so as to be positioned more on the +Y direction side than the uppermost cover member 51a even in the case that the saddle 36 is moved by a maximum movable amount in the +Y direction.

Similarly, the uppermost cover member 51a of the telescopic cover 50A provided on the −Y direction side of the saddle 36 is fixed via a non-illustrated stay to the −Y direction side of the saddle 36. On the other hand, the lowermost cover member 51c of the telescopic cover 50A provided on the −Y direction side of the saddle 36 is fixed via a non-illustrated stay to the pedestal 32, so as to be positioned more on the −Y direction side than the uppermost cover member 51a even in the case that the saddle 36 moves by a maximum movable amount in the −Y direction.

Stated otherwise, it is acceptable if the cover members 51a to 51c of the telescopic covers 50A are arranged so as to maintain a relationship in which the cover members 51a to 51c are positioned along the directions (in the Y-direction) of expansion and contraction of the telescopic covers 50A, sequentially in order of the cover member 51a, the cover member 51b, and the cover member 51c. The same feature is also true for the cover members 51a to 51c of the telescopic covers 50B, and it is acceptable if they are arranged so as to maintain a relationship in which the cover members 51a to 51c are positioned along the directions (in the X-direction) of expansion and contraction of the telescopic covers 50B, sequentially in order of the cover member 51a, the cover member 51b, and the cover member 51c.

The uppermost cover members 51a of the telescopic covers 50B are fixed to the table 20 which functions as a movable member, whereas the lowermost cover members 51c thereof are fixed to the saddle 36 which functions as a stationary member that is stopped with respect to the direction of movement (in the X-direction) of the table 20. Consequently, the telescopic covers 50B can protect the X-axis driving mechanism from chips and cutting fluid, while expanding and contracting in accordance with movements of the table 20 in the X-direction.

More specifically, the uppermost cover member 51a of the telescopic cover 50B provided on the +X direction side of the table 20 is fixed via a non-illustrated stay to the +X direction side of the table 20. On the other hand, the lowermost cover member 51c of the telescopic cover 50B provided on the +X direction side of the table 20 is fixed via a non-illustrated stay to the saddle 36, so as to be positioned more on the +X direction side than the uppermost cover member 51a even in the case that the table 20 is moved by a maximum movable amount in the +X direction.

Similarly, the uppermost cover member 51a of the telescopic cover 50B provided on the −X direction side of the table 20 is fixed via a non-illustrated stay to the −X direction side of the table 20. On the other hand, the lowermost cover member 51c of the telescopic cover 50B provided on the −X direction side of the table 20 is fixed via a non-illustrated stay to the saddle 36, so as to be positioned more on the −X direction side than the uppermost cover member 51a even in the case that the table 20 is moved by a maximum movable amount in the −X direction.

Stated otherwise, it is acceptable if the cover members 51a to 51c of the telescopic covers 50B are arranged so as to maintain a relationship in which they are positioned along the directions (in the X-direction) of expansion and contraction of the telescopic covers 50B, sequentially in order of the cover member 51a, the cover member 51b, and the cover member 51c.

Moreover, although the pedestal 32 also is stopped with respect to the direction of movement (in the X-direction) of the table 20, the lowermost cover members 51c of the telescopic covers 50B cannot be fixed to the pedestal 32. As the reason therefor, it is because, since the table 20 also is moved by the saddle 36 in the Y-direction with respect to the pedestal 32, the telescopic covers 50B would be damaged if the lowermost cover members 51c were fixed to the pedestal 32. Consequently, in the case of a configuration in which the saddle 36 is not provided, or stated otherwise, if the table 20 undergoes movement only in the X-direction with respect to the pedestal 32, the lowermost cover members 51c may be fixed to the pedestal 32.

Figure 3:
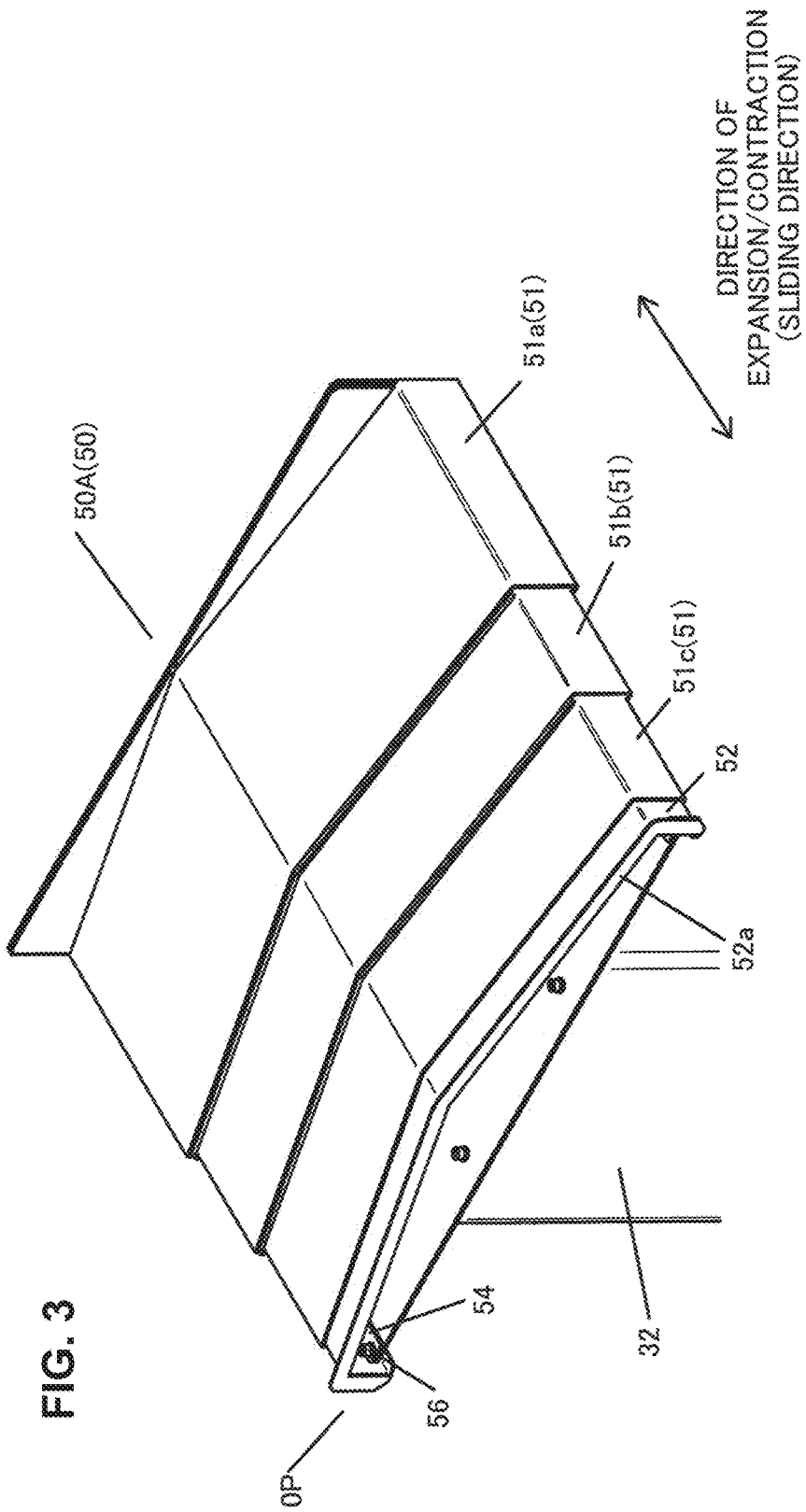
FIG. 3 is a view showing a state in which a telescopic cover, which is provided on a Y-direction side of a table (saddle) shown in FIG. 2, is elongated.
Figure 4:
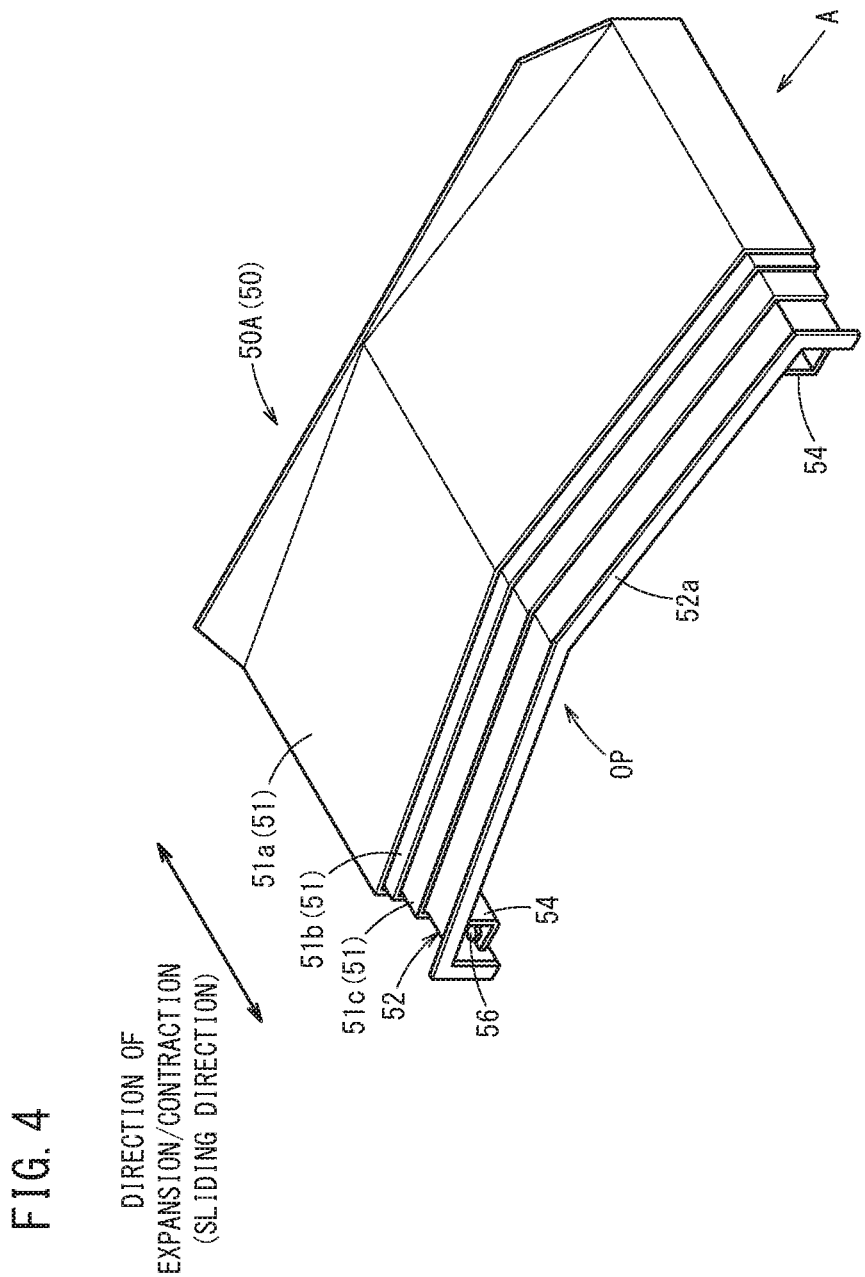
FIG. 4 is a view showing a state in which a telescopic cover, which is provided on a Y-direction side of a table (saddle) shown in FIG. 2, is contracted.

Next, a description will be given in detail concerning the telescopic covers 50 (50A, 50B) and the skirts 52. FIG. 3 is a view showing a state in which one of the telescopic covers 50A is elongated, and FIG. 4 is a view showing a state in which one of the telescopic covers 50A is contracted (shortened in length). Moreover, since the configuration of the telescopic cover 50B is the same as that of the telescopic cover 50A, description and illustration thereof are omitted.

Each of the plurality of cover members 51 (51a to 51c) of the telescopic cover 50A is formed with a substantially downwardly open U-shape (Π-shape) as viewed from the directions of expansion and contraction (in the movement direction of the saddle 36 or Y-direction) of the telescopic cover 50A. In addition, the cover member 51b provided on the lower side of the cover member 51a is disposed slidably (to be capable of sliding), and the cover member 51c provided on the lower side of the cover member 51b is disposed slidably (to be capable of sliding). Accordingly, the cover member 51b functions as a guide member for guiding the movement of the cover members 51a, 51c in the sliding direction (in the Y-direction, which is the direction of expansion and contraction) thereof. Conversely, the cover members 51a, 51c function as guide members for guiding the movement of the cover member 51b in the sliding direction (in the Y-direction, which is the direction of expansion and contraction) thereof.

Moreover, the width (length) in a direction perpendicular to the sliding direction is longest in the uppermost cover member 51a, is next longest in the middle stage cover member 51b, and is shortest in the lowermost cover member 51c. In accordance with this feature, the three cover members 51 (51a to 51c) can be superimposed in a nested manner so as to enable the telescopic cover 50A to be expanded and contracted.

Further, the three cover members 51 (51a to 51c) are provided with stoppers (latching members) so that the cover members 51 (51a to 51c) do not separate away mutually from each other in the event that the telescopic cover 50A is extended along the direction (Y-direction) of expansion and contraction thereof. More specifically, stoppers are provided on the cover members 51a, 51c so that the cover members 51a, 51c do not separate away from the cover member 51b, and stoppers are provided on the cover member 51b so that the cover member 51b does not separate away from the cover members 51a, 51c. Concerning the structure of the stoppers, since a conventional type of structure can be adopted therefor, detailed explanation of this feature is omitted.

In this manner, the telescopic covers 50 (50A, 50B) can expand and contract in accordance with the movement of the movable members (the saddle 36, the table 20). For example, in the case of the telescopic cover 50A provided on the +Y direction side of the saddle 36, when the saddle 36 moves in the −Y direction, since the cover member 51a moves together with the saddle 36 in the −Y direction, the telescopic cover 50A expands as shown in FIG. 3. Further, in the case of the telescopic cover 50A provided on the +Y direction side of the saddle 36, when the saddle 36 moves in the +Y direction, since the cover member 51a moves together with the saddle 36 in the +Y direction, the telescopic cover 50A contracts as shown in FIG. 4.

Similar to the cover members 51 (51a to 51c), the skirt 52 provided on the telescopic cover 50A is formed with a substantially (downwardly open) U-shape (Π-shape) as viewed from the direction of expansion and contraction (in the movement direction of the saddle 36 or Y-direction) of the telescopic cover 50A. Accordingly, the side surface (a surface perpendicular to the direction of expansion and contraction) of the skirt 52 has an opening OP. In addition, the skirt 52 is disposed slidably (to be capable of sliding) on the lower side of the cover member 51c. Owing thereto, the cover member 51c functions as a guide member for guiding the movement of the skirt 52 in the sliding direction. Moreover, the width (length) in a direction (X-direction) perpendicular to the sliding direction (Y-direction) of the skirt 52 is shorter than the length in a direction (X-direction) perpendicular to the sliding direction (Y-direction) of the cover member 51c. Consequently, the skirt 52 can be arranged in a nested fashion with respect to the cover member 51c.

The skirt 52 is disposed on the outer side of the telescopic cover 50A (cover member 51c) along the direction of expansion and contraction (Y-direction) of the telescopic cover 50A. Stoppers (not shown) which serve as latching members may be provided on the skirt 52 and the cover member 51c, so that when the skirt 52 is slid outwardly from the telescopic cover 50A (cover member 51c), the skirt 52 is prevented from separating away from the cover member 51c. An end portion 52a of the skirt 52 on a side opposite to the cover member 51c protrudes outwardly in a flange-like shape along a plane parallel to the XZ plane. The sliding direction of the skirt 52 and the sliding direction of the telescopic cover 50A are the same direction (Y-direction).

Figure 5:
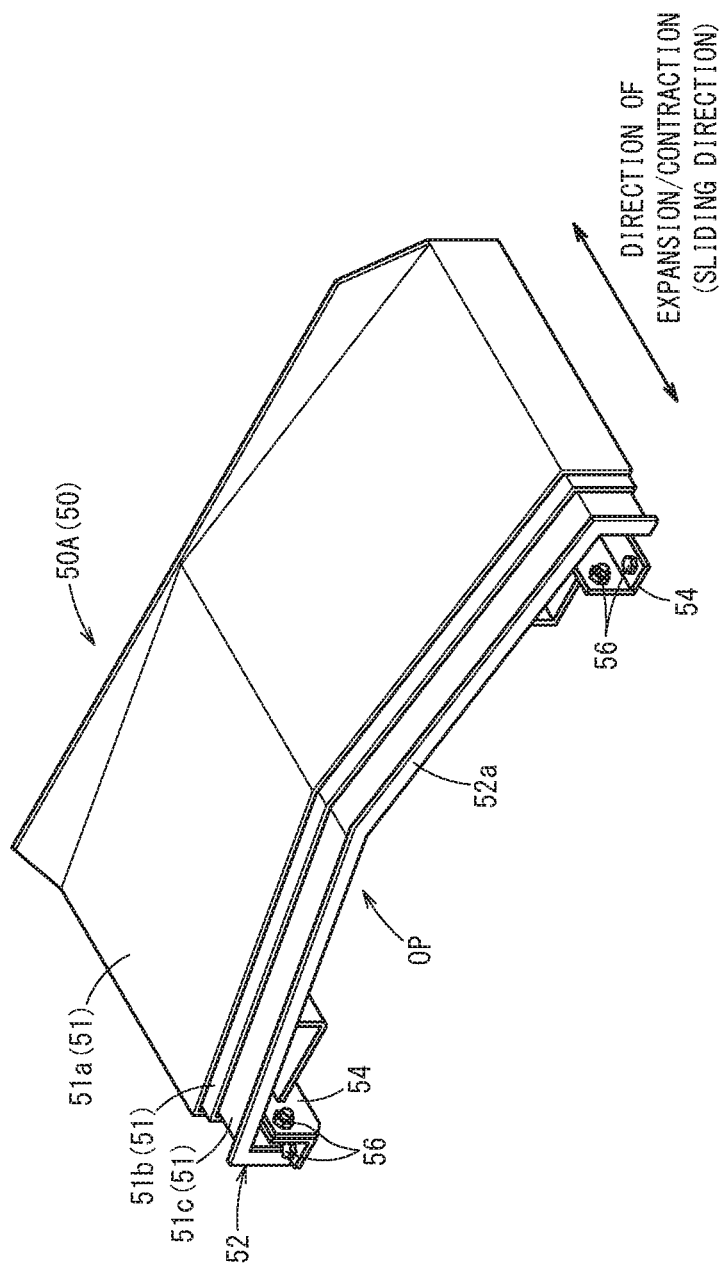
FIG. 5 is a view showing a state at a time that a skirt is slid on the telescopic cover, in the condition shown in FIG. 4.

FIG. 5 is a view showing a state at a time that the skirt 52 is slid toward the side of the telescopic cover 50A (on the side of the cover member 51c), in the condition shown in FIG. 4. Attached members 54 for attaching the telescopic cover 50A (cover member 51c) to the pedestal (stationary member) 32 are provided on the lower side of the lowermost cover member 51c. The attached members 54 are attached by fastening members 56 such as bolts or screws to stays that are connected to the pedestal 32. In this manner, the cover members 51c are fixed to the pedestal 32. The attached members 54 protrude outwardly along the direction of expansion and contraction (in the Y-direction, the direction in which the saddle 36 moves) of the telescopic covers 50A, and include holes therein (not shown) into which the fastening members 56 such as bolts or screws are inserted.

When the skirt 52 is slid along the direction (Y-direction) of expansion and contraction of the telescopic cover 50A in a direction toward the outer side of the telescopic cover 50A, that is, in a direction opposite to the side of the cover member 51c, the attached members 54 and the fastening members 56 are covered by the skirt 52 from the upper side (the +Z direction side) thereof (see FIGS. 3 and 4). On the other hand, when the skirt 52 is slid in the direction (Y-direction) of expansion and contraction of the telescopic cover 50A toward the inner side of the telescopic cover 50A, that is, in a direction toward the side of the cover member 51c, the attached members 54 and the fastening members 56 are exposed (See FIG. 5). In this manner, by sliding the skirt 52 along the directions of expansion and contraction of the telescopic cover 50A (in the Y-direction, or the direction of movement of the saddle 36), the attached members 54 and the fastening members 56 can either be exposed, or covered and concealed.

Figure 6:
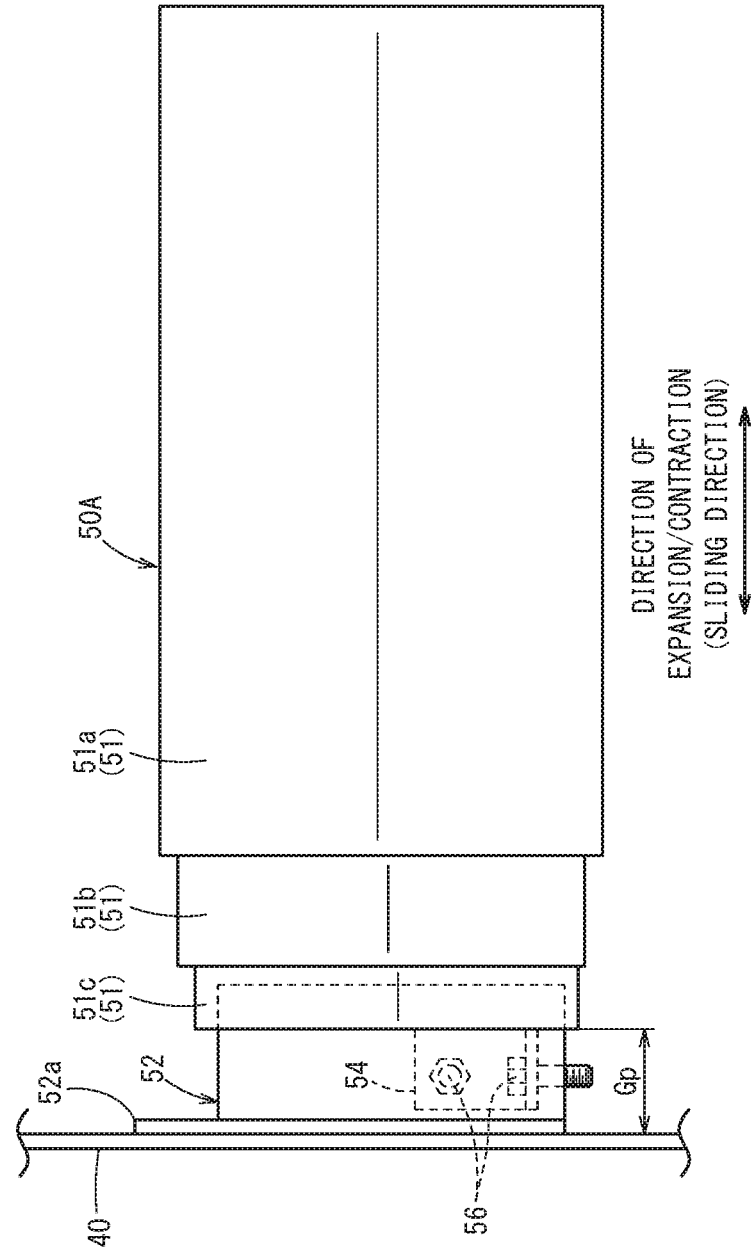
FIG. 6 is a side view showing the state of the skirt, which is provided on the telescopic cover located on the Y-direction side of the table (saddle), at a time of machining by the machine tool.
Figure 7:
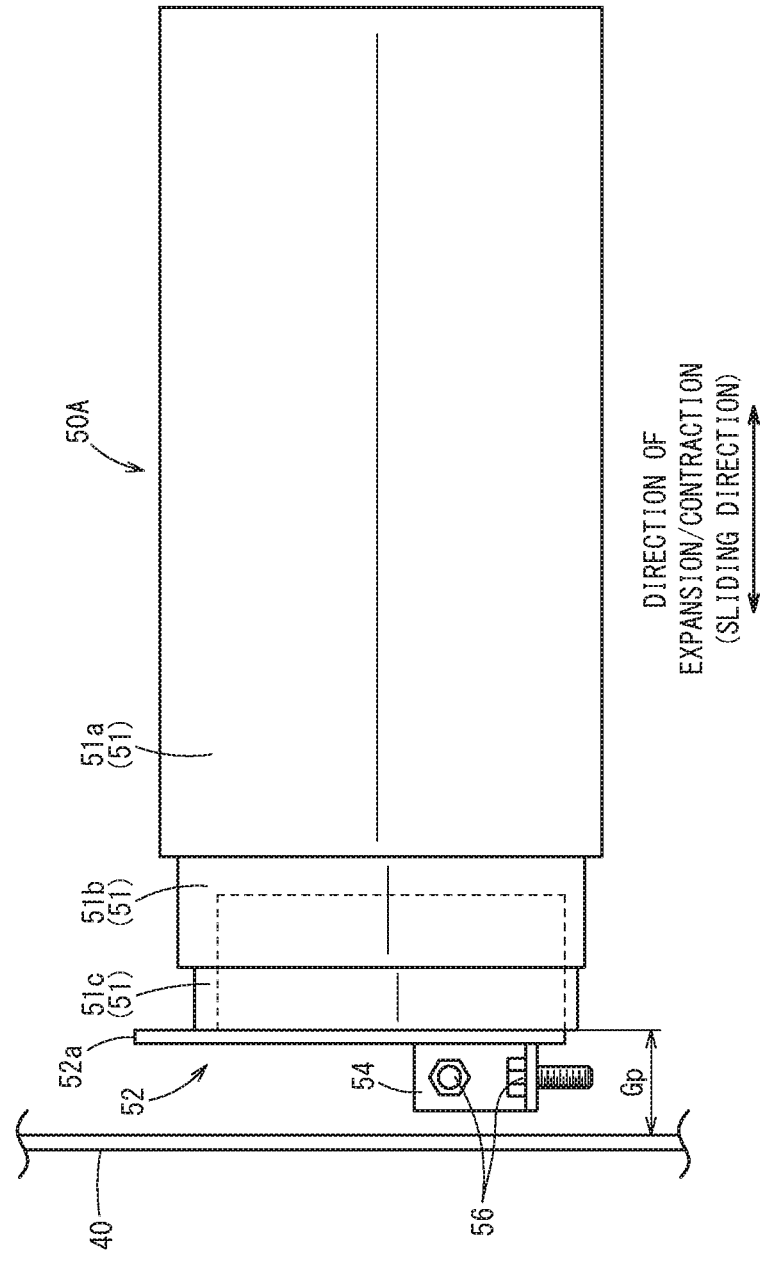
FIG. 7 is a side view showing a state of the skirt at a time of adjusting the position of the telescopic cover located on the Y-direction side of the table (saddle)

FIG. 6 is a side view showing the state of the skirt 52, which is provided on the telescopic cover 50A at a time of machining by the machine tool 10, and FIG. 7 is a side view showing a state of the skirt 52 at a time of adjusting the position (alignment) of the telescopic cover 50A. FIGS. 6 and 7 are drawings as viewed from the direction A in FIG. 4, which is parallel to the X-direction.

As shown in FIGS. 2 and 6, at least at a time of machining, the skirt 52 is slid in a direction opposite to the side of the cover member 51c (in the direction in which the attached members 54 project), so as to cover the attached members 54 and the fastening members 56, and so that the end portion 52a of the skirt 52 is made to abut against the splash guard 40. Consequently, the opening OP of the skirt 52 can be closed by the splash guard 40, and a gap Gp between the telescopic cover 50A (the cover member 51c) and the splash guard 40 can be covered by the skirt 52 from the upper side (the +Z direction side) thereof. Accordingly, it is possible to prevent chips and cutting fluid generated due to machining by the machine tool 10 from penetrating inside (into the interior of) the telescopic cover 50A. Further, since the skirt 52 is capable of simultaneously covering the attached members 54 and the fastening members 56 which are located in the gap Gp, chips can be prevented from becoming caught on the attached members 54 and the fastening members 56. Moreover, the abutment surface of the splash guard 40, which is placed in abutment against the end portion 52a (the flange portion that protrudes along the plane parallel to the XZ plane) of the skirt 52 provided on the telescopic cover 50A, is parallel to the XZ plane (see FIG. 2).

On the other hand, as shown in FIG. 7, at a time of adjusting the position of the telescopic cover 50A, the skirt 52 is slid in a direction toward the cover member 51c (in a direction opposite to the direction in which the attached members 54 project), and the end portion 52a of the skirt 52 is brought into abutment against an end portion on the skirt 52 side of the cover member 51c. Owing thereto, the attached members 54 and the fastening members 56, which are positioned in the gap Gp between (the cover member 51c of) the telescopic cover 50A and the splash guard 40, are exposed, and therefore, positional adjustment of the telescopic cover 50A can easily be performed by loosening the fastening members 56.

The column 18 and related components are provided between the splash guard 40 and the telescopic cover 50A that is disposed on the side in the +Y direction of the saddle 36 (see FIG. 2). Therefore, the end portion 52a of the skirt 52 provided on the telescopic cover 50A that is positioned on the +Y direction side of the saddle 36 cannot be brought into contact with the splash guard 40. Accordingly, in this case, it is preferable for the end portion 52a of the skirt 52 to be placed in contact with a flat surface (which may be a side surface of the column 18, or may be a separately provided flat plate) lying parallel to the XZ plane, which is positioned between the column 18 and the telescopic cover 50A that is provided on the +Y direction side of the saddle 36.

Figure 8:
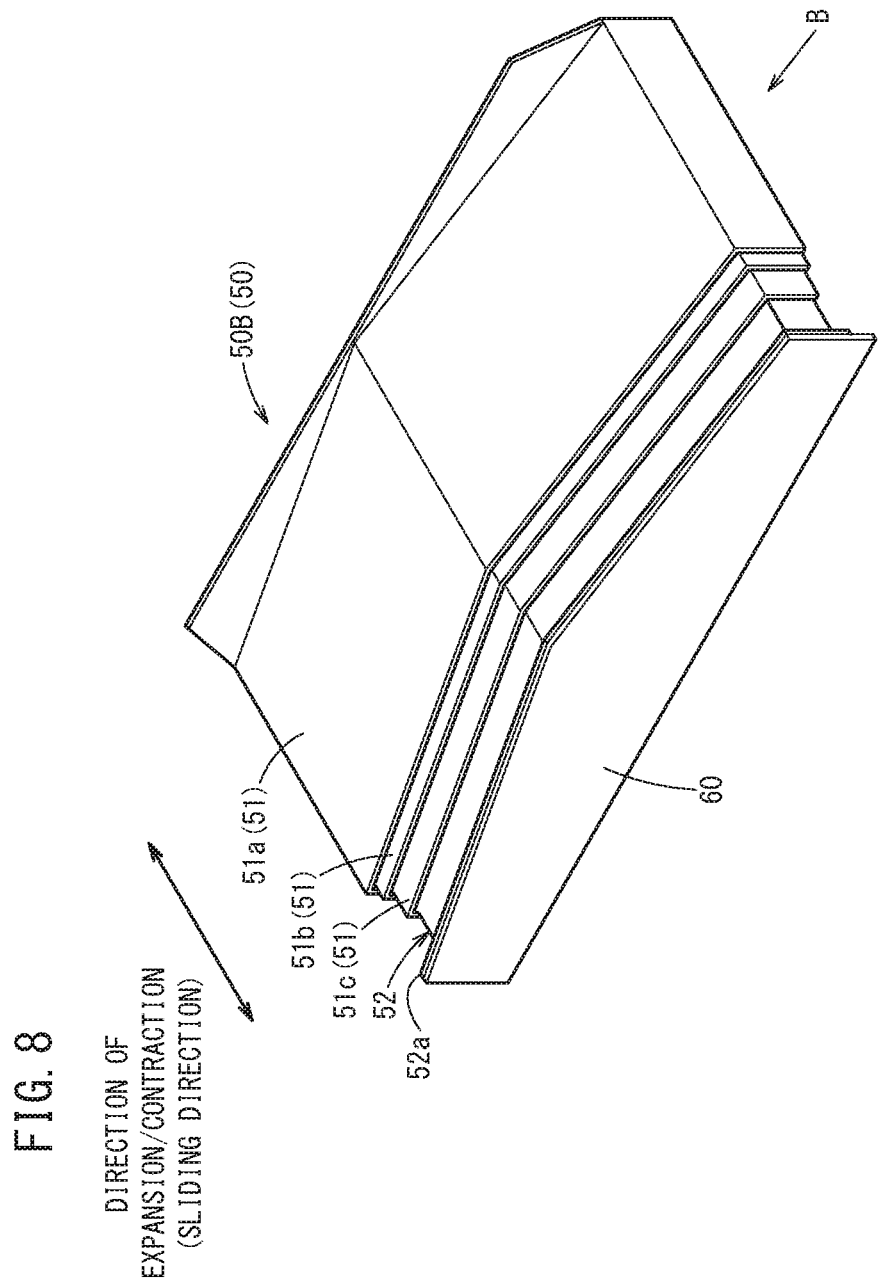
FIG. 8 is a view showing a state in which a telescopic cover, which is provided on an X-direction side of a table (saddle) shown in FIG. 2, is contracted.

FIG. 8 is a view showing a state in which the telescopic cover 50B is contracted (shortened in length). The telescopic cover 50B has the same configuration as that of the telescopic cover 50A, except that the direction in which the telescopic cover 50A is arranged is changed from the Y-direction to the X-direction, and a skirt 52 which is similar to the skirt 52 provided on the telescopic cover 50A is provided thereon. Moreover, the telescopic cover 50B is fixed to the table 20 that serves as a movable member, and to the saddle 36 that serves as a stationary member.

Since the telescopic cover 50B is fixed to the table 20 and the saddle 36, the telescopic cover 50B moves in the Y-direction together with the saddle 36, and expands and contracts in the X-direction due to movement of the table 20 in the X-direction. Accordingly, when the skirt 52 provided on the telescopic cover 50B is brought into abutment against the splash guard 40 as shown in FIG. 6, the movement accuracy in the Y-direction thereof is reduced due to friction. Further, even if the skirt 52 (the end portion 52a) provided on the telescopic cover 50B can be brought into abutment against the splash guard 40, since the end portion 52a of the skirt 52 undergoes sliding movement along the abutment surface of the splash guard 40, a gap is created between the splash guard 40 and the skirt 52, and there is a concern that chips and cutting fluid may enter inside (into the interior of) the telescopic cover 50B.

Thus, according to the present embodiment, a skirt cover 60 that covers the end portion 52a (opening OP) of the skirt 52 is further attached in a detachable manner to the skirt 52 disposed in the telescopic cover 50B. The skirt cover 60 is attached to the end portion 52a of the skirt 52. Since the opening OP of the skirt 52 is closed by providing the skirt cover 60, even if the skirt cover 60 and the splash guard 40 are not placed in abutment with each other, chips and cutting fluid that are generated due to machining by the machine tool 10 can be prevented from penetrating into the interior of the telescopic cover 50B.

Figure 9:
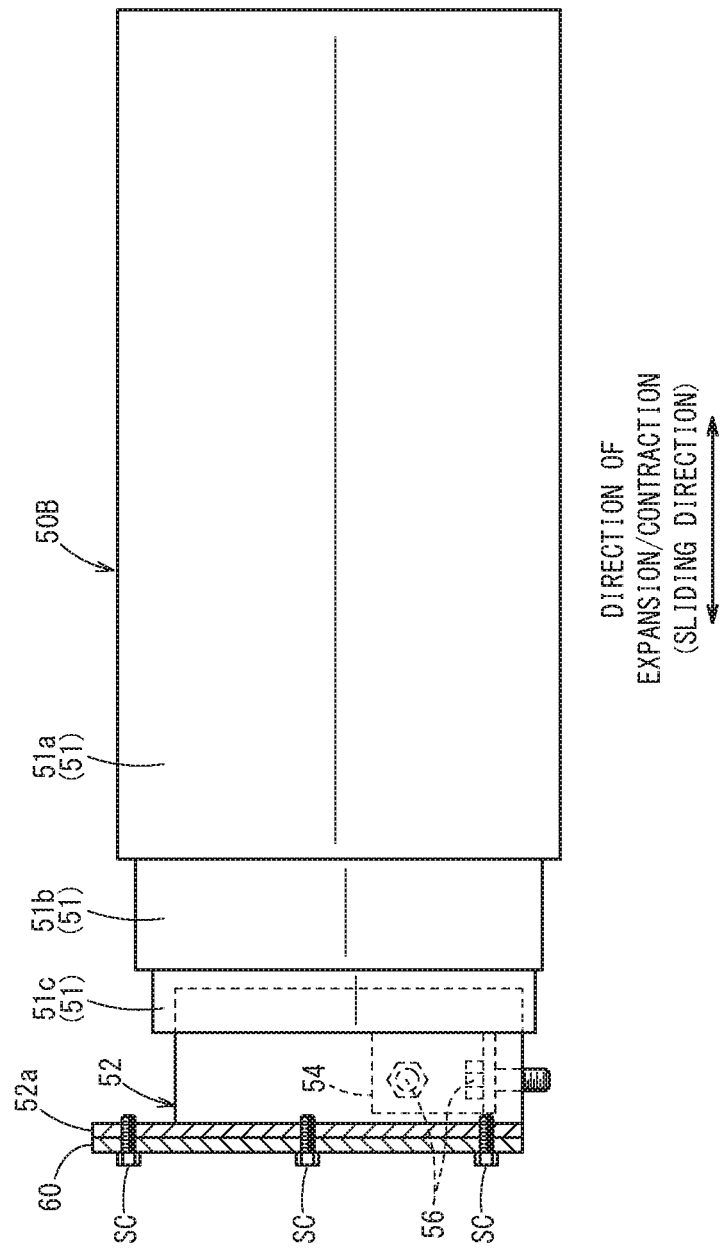
FIG. 9 is a side view showing the state of the skirt and a skirt cover, which are provided on the telescopic cover located on the X-direction side of the table (saddle), at a time of machining by the machine tool.

FIG. 9 is a side view showing the state of the skirt 52 and the skirt cover 60 at a time of machining by the machine tool 10, and FIG. 10 is a side view showing a state of the skirt 52 and the skirt cover 60 at a time of adjusting the position (alignment) of the telescopic cover 50B. FIGS. 9 and 10 are drawings as viewed from the direction B in FIG. 8, which is parallel to the Y-direction.

As shown in FIGS. 2 and 9, at least at a time of machining, in a state in which the skirt 52 is slid in a direction opposite to the side of the cover member 51c (in the direction in which the attached members 54 project) so as to cover the attached members 54 and the fastening members 56, the skirt cover 60 is attached by screws SC to the end portion 52a of the skirt 52. Consequently, even if the skirt cover 60 (or the skirt 52) and the splash guard 40 are not placed in abutment with each other, chips and cutting fluid that are generated due to machining by the machine tool 10 can be prevented from penetrating into the interior of the telescopic cover 50B.

On the other hand, as shown in FIG. 10, at a time of adjusting the position of the telescopic cover 50B, and after having loosened the screws SC and removed the skirt cover 60 from the skirt 52, the skirt 52 is slid in a direction toward the side of the cover member 51c (in a direction opposite to the direction in which the attached members 54 project). Owing thereto, the attached members 54 and the fastening members 56, which project outwardly from the cover member 51c along the direction of expansion and contraction (in the X-direction) of the telescopic cover 50B, are exposed, and therefore, positional adjustment of the telescopic cover 50B can easily be performed.

The above-described embodiment may be modified in the following ways.

(Modification 1) In the above-described embodiment, although a skirt cover 60 was not provided on the skirt 52 disposed in the telescopic cover 50A, a skirt cover 60 may be provided thereon. In this case, the skirt cover 60 may either be brought into contact, or may not be brought into contact with the splash guard 40.

(Modification 2) In Modification 2, a configuration may be provided in which the skirt 52 is slid in a direction opposite to the side of the cover member 51c (in the direction in which the skirt cover 60 is disposed), so as to pull out the skirt 52 from the telescopic cover 50B, and enable the skirt 52 to be removed from the telescopic cover 50B. In this case, it is acceptable for the skirt 52 and the cover member 51c not to be provided with stoppers that prevent the skirt 52 and the cover member 51c from being separated from each other.

Thus, according to the present Modification 2, as shown in FIG. 11, at a time of adjusting the position of the telescopic cover 50B, by sliding the skirt 52 in a state with the skirt cover 60 being attached thereto, and so as to be pulled out from the telescopic cover 50B, the attached members 54 and the fastening members 56 can be exposed. Accordingly, positional adjustment of the telescopic cover 50B can be performed easily. In this case, the skirt cover 60 may also be attached in a detachable manner to the skirt 52. The skirt 52 and the skirt cover 60 may also be formed together integrally by bending or welding the sheet metal from which they are composed.

Further, in a similar manner, the skirt 52 that is provided on the telescopic cover 50A (i.e., the skirt 52 to which the skirt cover 60 is not attached) may also be slid in such a manner that the skirt 52 is pulled out from the telescopic cover 50A, whereby the skirt 52 may be removed from the telescopic cover 50A.

(Modification 3) The features of the aforementioned Modification 1 and Modification 2 may be combined.

As has been described above, in the telescopic covers 50 (50A or 50B) according to the above-described embodiment and Modifications 1 to 3, the plurality of cover members 51 (51a to 51c) are superimposed in a nested fashion, and the telescopic covers 50 (50A or 50B) are expanded and contracted in accordance with movements of the movable members (the saddle 36 or the table 20) of the machine tool 10. The uppermost cover members 51a of the telescopic covers 50 (50A or 50B) are fixed to a movable member (the saddle 36 or the table 20), whereas the lowermost cover members 51c of the telescopic covers 50 (50A or 50B) are fixed to a stationary member (the pedestal 32 or the saddle 36) of the machine tool 10, the stationary member being stopped with respect to the direction of movement (the Y-direction or the X-direction) of at least the movable member (the saddle 36 or the table 20). The attached members 54, which project outwardly from the telescopic covers 50 (50A or 50B) along the direction of movement (X-direction or Y-direction) of the movable members (the saddle 36 or the table 20), and which are attached by the fastening members 56 to the stationary member (the pedestal 32 or the saddle 36), are provided on the lowermost cover members 51c. The telescopic covers 50 (50A or 50B) are provided with the skirts 52, which are capable of sliding along the direction of movement (the Y-direction or the X-direction) with respect to the lowermost cover members 51c, and which cover the attached members 54.

In accordance with this configuration, at a time of machining by the machine tool 10, the attached members 54 and the fastening members 56 can be protected from the chips and the cutting fluid. Consequently, it is possible to prevent the chips from becoming caught on the attached members 54 and the fastening members 56. On the other hand, when adjusting the position of the telescopic covers 50 (50A or 50B), by sliding the skirts 52, it is possible for the fastening members 56 to be exposed. Accordingly, positional adjustment of the telescopic covers 50 can be performed easily.

The skirts 52 are disposed underneath the lowermost cover members 51c, so as to overlap in a nested fashion with the lowermost cover members 51c. In accordance with this feature, it is possible to provide the skirts 52 on the telescopic covers 50 (50A or 50B), without hindering the expansion and contraction of the telescopic covers 50 (50A or 50B) in which the plurality of cover members 51 (51a to 51c) are superimposed in a nested fashion. Conversely, if the skirts 52 were provided above the lowermost cover members 51c, the skirts 52 and the cover members 51b (or 51a) would disadvantageously interfere with each other, thus hindering the expansion and contraction of the telescopic covers 50 (50A or 50B).

At a time of machining by the machine tool 10, end portions 52a of the skirts 52 on sides in the direction in which the attached members 54 protrude may abut against the splash guard 40, which is adapted to cover the machining area of the machine tool 10 and prevent scattering of chips and the cutting fluid that are generated by machining.

In accordance with this feature, at a time of machining, it is possible to prevent the chips and the cutting fluid from penetrating inside (into the interior) of the telescopic covers 50A, and to protect the attached members 54 and the fastening members 56 from the chips and the cutting fluid. Consequently, it is possible to prevent the chips from becoming caught on the attached members 54 and the fastening members 56. On the other hand, when adjusting the position of the telescopic covers 50A, by sliding the skirts 52 in a direction opposite to the direction in which the attached members 54 protrude, it is possible for the fastening members 56 to be exposed. Accordingly, positional adjustment of the telescopic covers 50 can be performed easily.

The skirt covers 60 may be attached to the skirts 52, the skirt covers 60 covering the end portions 52a of the skirts 52 on a side in the direction in which the attached members 54 protrude, and preventing chips and cutting fluid that are generated due to machining by the machine tool 10 from penetrating into the interior of the telescopic covers 50 (50A or 50B).

In accordance with this feature, even if the skirts 52 (the skirt covers 60) are not in abutment against the splash guard 40, at a time of machining, it is possible to prevent the chips and the cutting fluid from entering inside (into the interior of) the telescopic covers 50 (50A, 50B). As a result, the attached members 54 and the fastening members 56 can be protected from the chips and the cutting fluid. Consequently, it is possible to prevent the chips from becoming caught on the attached members 54 and the fastening members 56. Further, on the other hand, at a time of adjusting the position of the telescopic covers 50 (50A or 50B), after having removed the skirt covers 60 from the skirts 52, by sliding the skirts 52 in a direction opposite to the direction in which the attached members 54 protrude, or by sliding the skirts 52 on which the skirt covers 60 is mounted in the direction in which the attached members 54 protrude, it is possible to expose the fastening members 56. Accordingly, positional adjustment of the telescopic covers 50 (50A or 50B) can be performed easily. Moreover, the skirt covers 60 may be mounted detachably with respect to the skirts 52, or may be mounted thereon in a non-detachable manner.

Further, the fastening members 56 may be exposed by sliding the skirts 52 in the direction in which the attached members 54 protrude, and then removing the skirts 52 from the telescopic covers 50 (50A or 50B). Accordingly, positional adjustment of the telescopic covers 50 (50A or 50B) can be performed easily.

The present invention is not limited to the above embodiments, and it goes without saying that various changes and modifications can be made therein without departing from the spirit and scope of the invention.

What is claimed is:

1. A telescopic cover for a machine tool, the telescopic cover comprising:
  a plurality of cover members superimposed telescopically, the plurality of cover members configured to expand and contract in response to movement of a movable member of the machine tool, wherein
    an uppermost cover member of the plurality of cover members is fixed to the movable member,
    a lowermost cover member of the plurality of cover members is fixed to a stationary member of the machine tool, and
    the stationary member is stationary with respect to a direction of movement of at least the movable member;
  an attached member which is provided on the lowermost cover member,
    protrudes outwardly along the direction of movement from the lowermost cover member, and
    fixes the lowermost cover member stationary to the stationary member by fastening members; and
  a skirt telescopically coupled to the lowermost cover member and configured to
    be slidable along the direction of movement with respect to the lowermost cover member, and
    cover the attached member and the fastening members.

2. The telescopic cover according to claim 1, wherein the skirt is disposed underneath the lowermost cover member, so as to overlap telescopically with the lowermost cover member.

3. The telescopic cover according to claim 1, wherein, at a time of machining by the machine tool, an end portion of the skirt on a side in a direction in which the attached member protrudes abuts against a splash guard which is adapted to cover a machining area of the machine tool and prevent scattering of chips that are generated by machining.

4. The telescopic cover according to claim 1, further comprising:
a skirt cover attached to the skirt, the skirt cover covering an end portion of the skirt on a side in a direction in which the attached member protrudes, and preventing chips that are generated due to machining by the machine tool from penetrating into an interior of the telescopic cover.

5. The telescopic cover according to claim 4, wherein the skirt cover is mounted detachably to the skirt.

6. A method of adjusting a telescopic cover for a machine tool, the telescopic cover comprising a plurality of cover members telescopically superimposed to expand and contract in response to movement of a movable member of the machine tool, the method comprising:
fixing an uppermost cover member of the plurality of cover members to the movable member;
fixing a lowermost cover member of the plurality of cover members to a stationary member of the machine tool, wherein the stationary member is stationary with respect to a direction of movement of at least the movable member;
providing an attached member on the lowermost cover member, wherein the attached member protrudes outwardly along the direction of movement from the lowermost cover member;
fixing the lowermost cover member stationary to the stationary member by fastening members;
providing a skirt, which is slidable along the direction of movement with respect to the lowermost cover member, and which covers the attached member and the fastening members, wherein the skirt is telescopically coupled to the lowermost cover member; and
sliding the skirt to thereby expose the fastening members.

7. The method according to claim 6, further comprising:
placing an end portion of the skirt on a side in a direction in which the attached member protrudes in abutment against a splash guard which is adapted to cover a machining area of the machine tool and prevent scattering of chips that are generated by machining; and
sliding the skirt in a direction opposite to the direction in which the attached member protrudes to thereby expose the fastening members.

8. The method according to claim 6, further comprising the steps of:
detachably mounting a skirt cover on the skirt, the skirt cover covering an end portion of the skirt on a side in a direction in which the attached member protrudes, and preventing chips that are generated due to machining by the machine tool from penetrating into an interior of the telescopic cover; and
after having removed the skirt cover from the skirt, sliding the skirt in the direction opposite to the direction in which the attached member protrudes to thereby expose the fastening members.

9. The method according to claim 6, further comprising:
mounting a skirt cover on the skirt, the skirt cover covering an end portion of the skirt on a side in a direction in which the attached member protrudes, and preventing chips that are generated due to machining by the machine tool from penetrating into an interior of the telescopic cover; and
sliding the skirt on which the skirt cover is mounted in the direction in which the attached member protrudes, and removing the skirt from the telescopic cover to thereby expose the fastening members.

10. The telescopic cover according to claim 1, wherein an end portion of the skirt on a side opposite to the plurality of cover members has a flange that protrudes outwardly in a direction transverse to the direction of movement.

11. The telescopic cover according to claim 10, wherein an end of the attached member, on a side in a direction in which the attached member protrudes, is located inward from the end portion of the skirt in the direction of movement.

12. The telescopic cover according to claim 1, wherein when the skirt is slid toward of the plurality of cover members, the attached member and the fastening members are exposed.

13. A telescopic cover for a machine tool,
the machine tool having
a pedestal,
a saddle supported on the pedestal and movable in a first direction relative to the pedestal, and
a table supported on the saddle and movable in a second direction relative to the saddle, the second direction transverse to the first direction,
the telescopic cover comprising:
at least one set of first cover members telescopically superimposed to expand and contract in the first direction in accordance with movement of the saddle, the first cover members comprising
an uppermost first cover member configured to be fixed to the saddle, and
a lowermost first cover member stationary fixed by first fastening members to the pedestal;
at least one set of second cover members telescopically superimposed to expand and contract in the second direction in accordance with movement of the table, the second cover members comprising
an uppermost second cover member configured to be fixed to the table, and
a lowermost second cover member configured to be stationary fixed by second fastening members to the saddle;
at least one first skirt telescopically coupled to a lower side of the lowermost first cover member, and slidable in the first direction with respect to the lowermost first cover member to cover or expose the first fastening members; and
at least one second skirt disposed on a lower side of the lowermost second cover member, and slidable in the second direction with respect to the lowermost second cover member to cover or expose the second fastening members.

14. The telescopic cover according to claim 13, wherein
the at least one set of first cover members comprises two sets of first cover members respectively arranged on opposite first sides of the table in the first direction, and
the at least one set of second cover members comprises two sets of second cover members respectively arranged on opposite second sides of the table in the second direction.

* * * * *